(12) United States Patent
Maekawa et al.

(10) Patent No.: US 6,467,466 B1
(45) Date of Patent: Oct. 22, 2002

(54) GAS LEAKAGE DETECTION AND FAIL-SAFE CONTROL METHOD FOR GAS-FUELED INTERNAL COMBUSTION ENGINE AND APPARATUS FOR IMPLEMENTING THE SAME

(75) Inventors: Masahiro Maekawa, Kakogawa (JP); Takahiro Aki, Kobe (JP); Kohei Igarashi, Susono (JP); Hiroki Matsuoka, Susono (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/624,250

(22) Filed: Jul. 24, 2000

(30) Foreign Application Priority Data

Jul. 30, 1999 (JP) .............................. 11-217783

(51) Int. Cl.$^7$ ............................... F02B 43/00
(52) U.S. Cl. ................. 123/529; 123/198 D; 73/40.5 R
(58) Field of Search ....................... 73/40.5 R; 123/527, 123/529, 198 D

(56) References Cited

U.S. PATENT DOCUMENTS

| | | | |
|---|---|---|---|
| 5,542,397 A | | 8/1996 | Takahata et al. ............. 123/520 |
| 5,554,976 A | * | 9/1996 | Miyauchi et al. ........ 73/40.5 R |
| 5,611,316 A | | 3/1997 | Oshima et al. ............. 123/494 |

FOREIGN PATENT DOCUMENTS

| | | |
|---|---|---|
| JP | 3-222613 * | 10/1991 |
| JP | 5-248269 | 9/1993 |
| JP | 7-189789 | 7/1995 |
| JP | A-7-305660 | 11/1995 |
| JP | 8-82250 | 3/1996 |
| JP | 8-277750 | 10/1996 |
| JP | A-9-151812 | 6/1997 |
| JP | 9-242614 | 9/1997 |
| JP | A-9-242614 | 9/1997 |
| JP | A-10-281008 | 10/1998 |
| JP | 11-107860 | 4/1999 |

* cited by examiner

Primary Examiner—Noah P. Kamen
(74) Attorney, Agent, or Firm—Oliff & Berridge, PLC

(57) ABSTRACT

A method and apparatus is provided that can detect even small amounts of gas leakage and can perform a proper fail-safe operation when gas leakage is detected. When an engine is stopped and a gas shut-off valve is closed, the amount of decrease of gas pressure is calculated by comparing initial gas pressure with the gas pressure detected after the elapse of a prescribed time, to detect gas leakage. In one embodiment, gas leakage is detected by calculating the accumulated value of the amount of decrease of gas pressure each time the engine is stopped. In another embodiment, gas leakage is detected by calculating the rate of decrease of gas pressure from the initial gas pressure to the gas pressure detected after the elapse of a prescribed time. In a further embodiment, gas leakage is detected by calculating the accumulated value of the rate of decrease of gas pressure each time the engine is stopped. Further, when gas leakage is detected, the gas shut-off valve is closed and a warning is issued.

30 Claims, 8 Drawing Sheets

GAS LEAKAGE DETECTION AND FAIL-SAFE CONTROL METHOD FOR GAS-FUELED INTERNAL COMBUSTION ENGINE AND APPARATUS FOR IMPLEMENTING THE SAME

BACKGROUND OF THE INVENTION

1. Field of the Invention

The present invention relates to gas leakage detection and fail-safe control method for a gas-fueled internal. combustion engine, and more particularly to a gas leakage detection and fail-safe control method that can detect even small amounts of gas leakage and that, when gas leakage is detected, controls a gas shut-off valve for fail-safe purposes and issues a warning. The invention also relates to an apparatus for implementing such a method.

2. Description of the Related Art

Gas fuels, such as natural gas, have been used as automobile fuels in recent years. In use, natural gas is filled under pressure into a container; to supply this pressure-filled compressed natural gas (CNG) into an engine, an injector valve is used, as in the case of gasoline.

A vehicle injector device is designed to pass an electric current through the magnetic coil of the injector under electronic control, and the resulting magnetic force moves an injector valve, thereby forming a gap between it and an injection nozzle and thus allowing the fuel to flow through the gap.

A gas-fueled internal combustion engine uses, instead of gasoline, compressed natural gas as a fuel as described above and, since high-pressure natural gas is stored in the tank, a sensor for detecting gas pressure is mounted to detect gas leakage. When gas leakage occurs, a fail-safe operation is performed which involves, for example, closing the gas shut/off valve.

However, the reality is that, since the gas leakage detection is performed with the gas shut-off valve open when the engine is running, for example, when the vehicle is moving, it is difficult to detect a small amount of gas leakage when the gas pressure is high. That is, it is difficult to distinguish whether a gas pressure decrease is the result of gas consumption by the engine or is caused by gas leakage.

SUMMARY OF THE INVENTION

It is, accordingly, an object of the present invention to provide a method and apparatus that can detect even small amounts of gas leakage and, when gas leakage is detected, can perform a proper fail-safe operation.

To attain the above object, the gas leakage detection and fail-safe control method for a gas-fueled internal combustion engine according to the present invention calculates the amount of decrease of gas pressure when the engine is stopped and the gas shut-off valve is closed, by comparing initial gas pressure with the gas pressure detected after the elapse of a prescribed time, and detects gas leakage by determining that gas is leaking if the amount of decrease is larger than a predetermined value. In one embodiment, each time the engine is stopped, the accumulated value of the amount of decrease of gas pressure is calculated, and gas leakage is detected by determining that gas is leaking if the accumulated value is larger than a predetermined value.

In another embodiment, the rate of decrease of gas pressure from the initial gas pressure to the gas pressure detected after the elapse of a prescribed time is calculated, and gas leakage is detected by determining that gas is leaking if the rate of decrease is larger than a predetermined value. In a further embodiment, each time the engine is stopped, the accumulated value of the rate of decrease of gas pressure is calculated, and gas leakage is detected by determining that gas is leaking if the accumulated value is larger than a predetermined value.

When gas leakage is detected, a fail-safe operation is performed, for example, by closing a delivery gas shut-off valve and issuing a warning.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

The preferred embodiments of the present invention will be described below with reference to the accompanying drawings.

Figure 1:
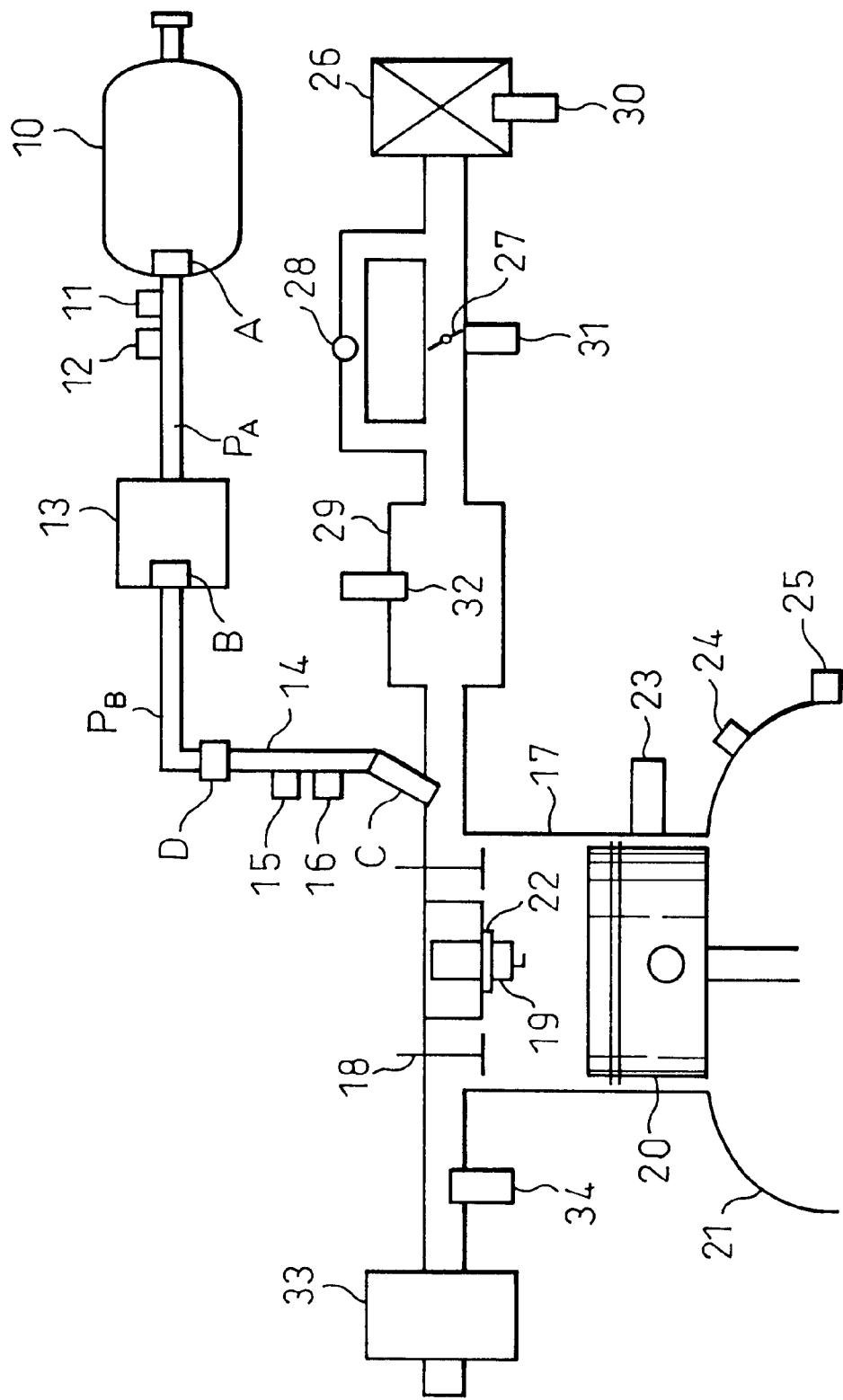
FIG. 1 is a drawing showing in schematic form a fuel supply system for a gas-fueled internal combustion engine to which the present invention is applied.

FIG. 1 is a drawing showing in schematic form a fuel supply system for a gas-fueled internal combustion engine to which the present invention is applied. Reference numeral 10 is a gas tank in which compressed fuel is filled under pressure of about 200 to 250 $kg/cm^2$. A first gas shut-off valve A as a gas tank shut-off valve is provided at the outlet of the gas tank 10, and downstream thereof are mounted a tank gas pressure sensor 11 and a tank gas temperature sensor 12. The fuel gas which has passed through the first gas shut-off valve A is fed into a pressure regulator 13 where the gas is converted to a low-pressure gas with its pressure reduced, for example, from about 200 $kg/cm^2$ to about 9 $kg/cm^2$. A second gas shut-off valve B as a regulator gas shut-off valve is provided at the outlet of the pressure regulator 13, and the gas exiting it is passed through a delivery pipe 14 and introduced into a gas injector C. Then, under control of an electronic control unit (ECU), an injector valve provided in the gas injector C is driven to inject the gas. A third gas shut-off valve D is installed in the delivery pipe 14 between the pressure regulator 13 and the gas injector C, and a delivery gas pressure sensor 15 and a delivery gas temperature sensor 16, which are used in the present invention, are mounted in section of the delivery pipe. 14 between the third gas shut-off valve D and the gas injector C.

The engine 17 includes a valve 18, an ignition plug 19, a piston 20, and a crank case 21; a combustion pressure sensor 22 is mounted inside the combustion chamber. Reference numeral 23 is a coolant temperature sensor, 24 is an engine rpm sensor, and 25 is a vehicle speed sensor. At the air intake side are provided an air cleaner 26, a throttle 27, an ISC valve 28, and a surge tank 29, through which combustion air is introduced. Reference numeral 30 is an intake air pressure sensor mounted in the air cleaner 26, 31 is a throttle sensor linked with the throttle 27, and 32 is an intake air temperature sensor. At the exhaust side is mounted a catalytic unit 33; upstream of which is disposed an A/F sensor (air/fuel ratio sensor).

Figure 2:
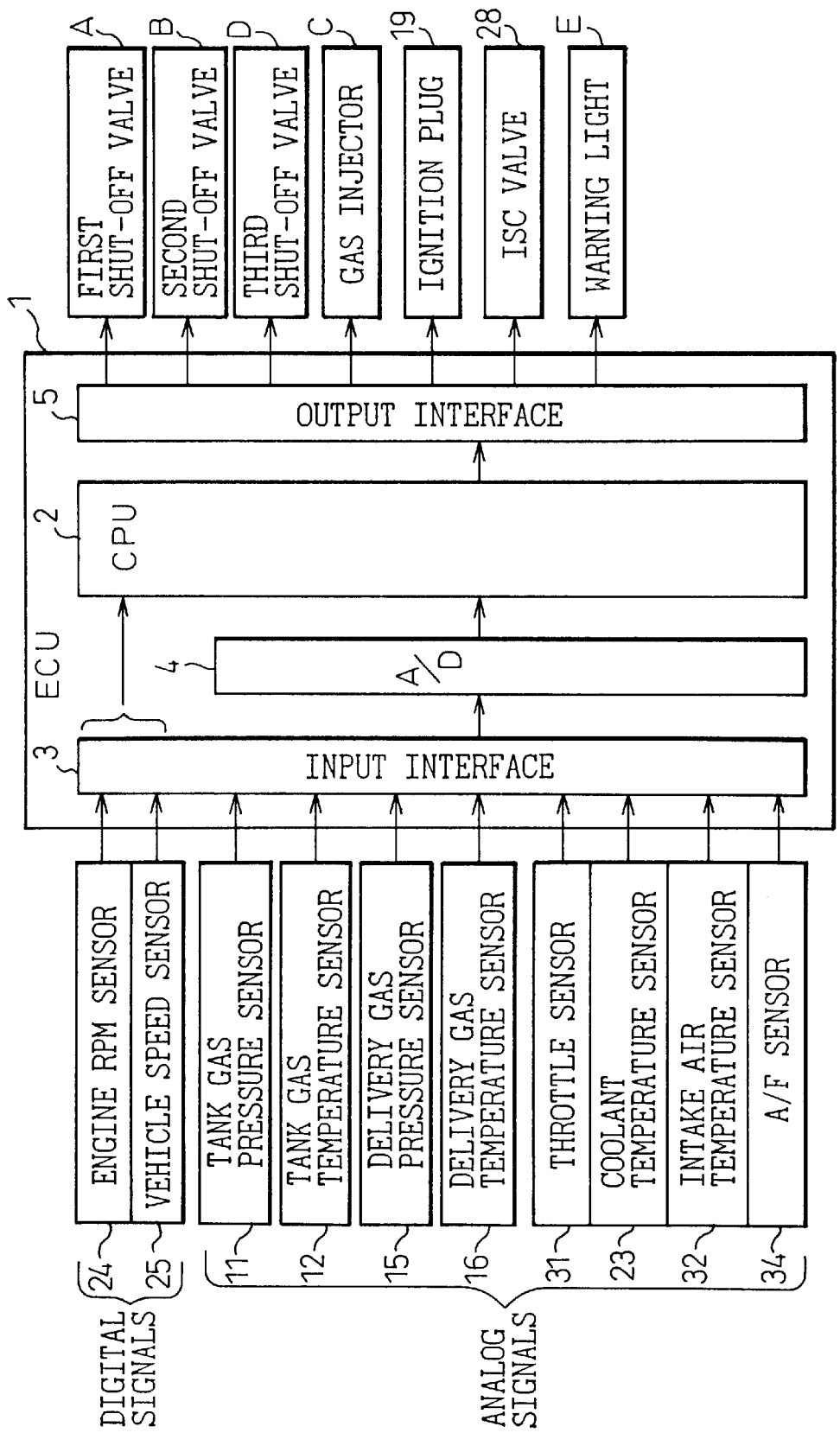
FIG. 2 is a diagram outlining the configuration of an apparatus for implementing the gas leakage detection and fail-safe control method of the present invention.

FIG. 2 is a diagram outlining the configuration of a gas leakage fail-safe control apparatus according to the present invention. In the figure, reference numeral 1 is the electronic control unit (ECU) which comprises a CPU 2, an input interface 3, an A/D converter 4, and an output interfaces 5.

Detection signals from the various sensors shown in FIG. 1 are input into the input interface 3. Of these detection signals, those from the engine rpm sensor 24 and the vehicle speed sensor 25 are digital signals and are, therefore, passed from the input interface 3 directly to the CPU 2. On the other hand, the detection signals from the gas fuel related sensors, i.e., the tank gas pressure sensor 11, the tank gas temperature sensor 12, the delivery gas pressure sensor 15, and the delivery gas temperature sensor 16, are analog signals and are, therefore, converted into digital signals by the A/D converter 4 before being input to the CPU 2. Signals from the throttle sensor 31, coolant temperature sensor 23, intake air temperature sensor 32, and A/F sensor 34 are also analog signals and are, therefore, converted into digital signals by the A/D converter 4 before being input to the CPU 2.

Based on the various sensor detection signals described above, the CPU 2 controls various operations through the output interface 5, such as the on/off operations of the first gas shut-off valve A, the second gas shut-off valve B, and the third gas shut-off valve D, the injection operation of the gas injector C through energization of the injection valve, etc., and the on/off operation of a warning light E. The control operations also include controlling the ignition timing of the ignition plug 19 and the action of the ISC valve 28.

In the present invention, gas leakage detection is performed when the engine is stopped and the gas shut-off valves are closed. When the engine is stopped and the first gas shut-off valve A and second gas shut-off valve B in FIG. 1 are closed, gas leakage in the pipe between the first gas shut-off valve A and the second gas shut-off valve B can be detected by detecting a change in the tank gas pressure $P_A$ representing the gas pressure in the path between them. Likewise, when the second gas shut-off valve B and the gas injector C are closed, gas leakage in the pipe between the second gas shut-off valve B and the gas injector C can be detected by detecting a change in the delivery gas pressure $P_B$ representing the gas pressure in the path between them. Further, when the gas shut-off valves A and B and the valve of the injector C are closed, gas leakage in the above two pipes can be detected by detecting changes in the tank gas pressure $P_A$ and delivery gas pressure $P_B$. When the engine is stopped, since the first gas shut-off valve A, the second gas shut-off valve B, and the valve of the injector C are closed, gas leakage can be detected by respectively detecting changes in both the tank gas pressure $P_A$ and the delivery gas pressure $P_B$. In this case, it is possible to detect in which pipe gas leakage occurs if it does occur. It is also possible to detect gas leakage by detecting a change only in the tank gas pressure $P_A$ or in the delivery gas pressure $P_B$, as needed. These gas pressures $P_A$ and $P_B$ are detected by the tank gas pressure sensor 11 and the delivery gas pressure sensor 15, respectively, shown in FIG. 1.

Figure 3:
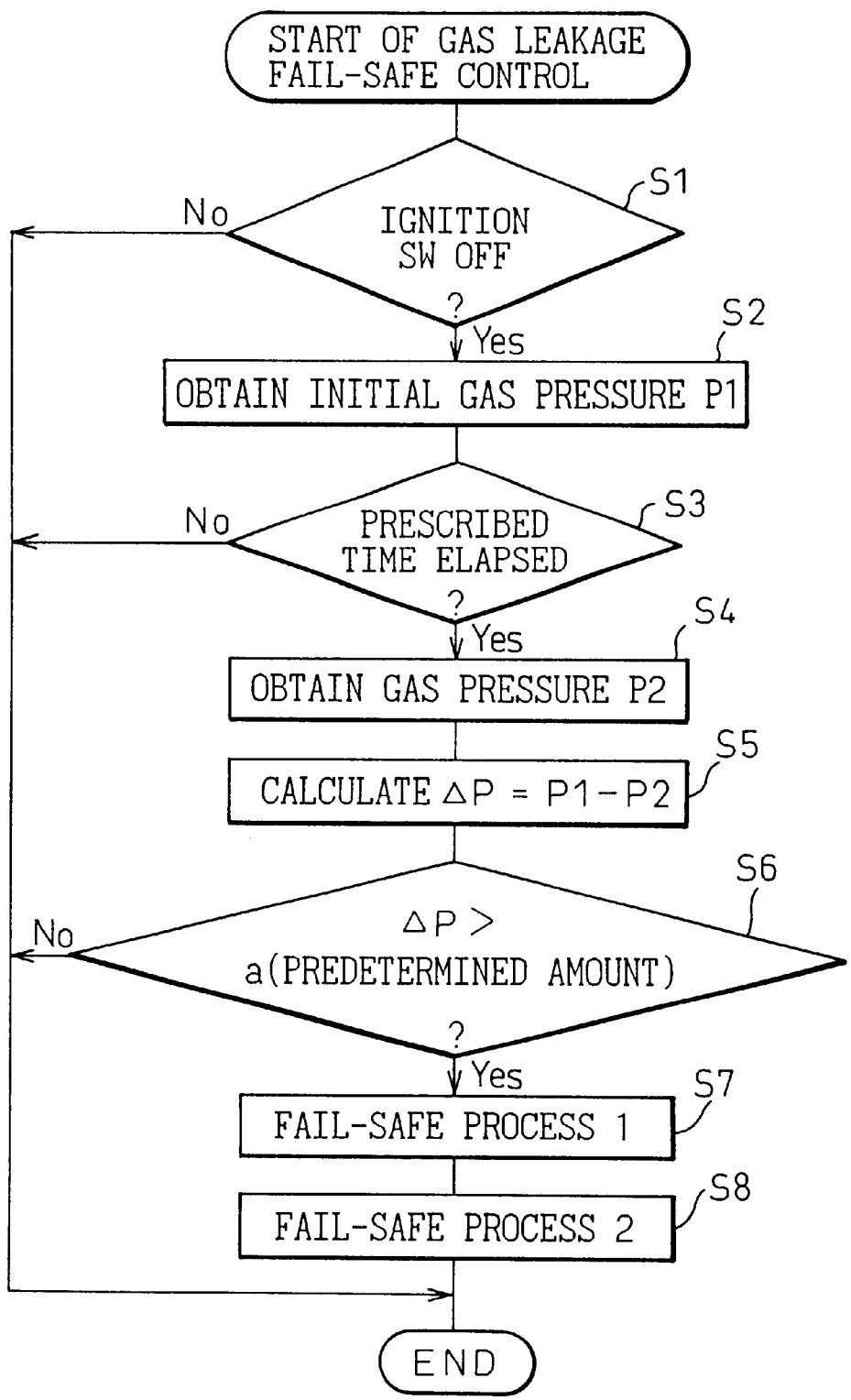
FIG. 3 is a flowchart illustrating the operation of an embodiment of the gas leakage detection and fail-safe control of the present invention.

FIG. 3 is a flowchart illustrating the operation of an embodiment of the gas leakage fail-safe control of the present invention. Unlike the prior art which detects gas pressure when the engine is running and the gas shut-off valves are open, the present invention detects gas pressure to check for gas leakage when the engine is stopped and the gas shut-off valves are closed. The control shown in the flowchart described below is performed by the CPU 2.

When the gas leakage fail-safe control is started, first it is determined whether the ignition switch is OFF (S1). If the answer is YES, meaning that the engine is not running, and that the first gas shut-off valve A, the second gas shut-off valve B, and the valve of the gas injector C are closed, gas pressure P1 in this condition is obtained (S2). In this case, $P_A$ or $P_B$ or both are obtained as the gas pressure. Next, it is determined whether a prescribed time has elapsed since the gas pressure P1 was obtained (S3). If the answer is YES, meaning that the prescribed time has elapsed, gas pressure P2 at that point in time is obtained (S4). In this case also, $P_A$ or $P_B$ or both are obtained as the gas pressure. Then, the difference between the first obtained gas pressure P1 and the gas pressure P2 obtained after the prescribed time has elapsed, that is, $\Delta P = P1 - P2$, is calculated (S5). In this case also, gas pressure difference $\Delta P_A$ or $\Delta P_B$ or $\Delta P_{A+B}$ is calculated for the gas pressure $P_A$ or $P_B$ or both, respectively. If gas is leaking, the value of $\Delta P$ becomes large. Therefore, it is determined next whether $\Delta P$ is larger than a predetermined amount a (S6). As previously noted, the tank gas pressure $P_A$, i.e., the gas pressure ion the path between the first gas shut-off valve A and the second gas shut-off valve B, is normally in the range of about 200 to 250 kg/cm². In view of this, setting a=10 kg/cm², for example, if $\Delta P > 10$ kg/cm² then it is determined that gas is leaking. On the other hand, the tank gas pressure $P_B$, i.e., the gas pressure in the path between the second gas shut-off valve B and the gas injector C, is normally 9 kg/cm², as previously noted. In view of this, setting a=3 kg/cm², for example, if $\Delta P > 3$ kg/cm² then it is determined that gas is leaking. The sum of both pressure differences may be used. In that case, a=10 kg/cm² +3 kg/cm² =13 kg/cm². The value of a can be changed to suit specific situations. If the answer is YES in S6, that is, if it is determined that gas is leaking, fail-safe process 1 (S7) and fail-safe process 2 (S8) are carried out. In this case, either one or both of the processes 1 and 2 may be carried out. If the answer is NO in S1, S3, or S6, the process is terminated and then restarted.

The fail-safe process 1 can proceed as follows. First, when it is determined that gas is leaking, the third gas shut-off valve D is closed. Though the shut-off valves A and B and the valve of the injector C are already closed at this point in time, the valve D is also closed here to keep the gas leakage amount as small as possible. Or, after the third gas shut-off valve D is closed, the shut-off valves A, B, and D and the valve of the injector C are all kept closed until a battery is disconnected and a memory is cleared. That is, when gas leakage is detected, the condition is stored, and all the shut-off valves are kept closed so that as long as the condition is stored, the engine will not start if the ignition key is turned on.

The fail-safe process 2 can proceed as follows. First, when it is determined that gas is leaking, a warning is issued by illuminating or flashing a warning light such as a low gas fuel warning light. Or, a warning is issued by flashing a warning light such as a low gas fuel warning light, the flashing cycle of the warning light being changed according to the degree of the gas pressure drop. The warning may be issued using an audible means or by a combination of an audible means and an illuminating or flashing means.

Figure 4:
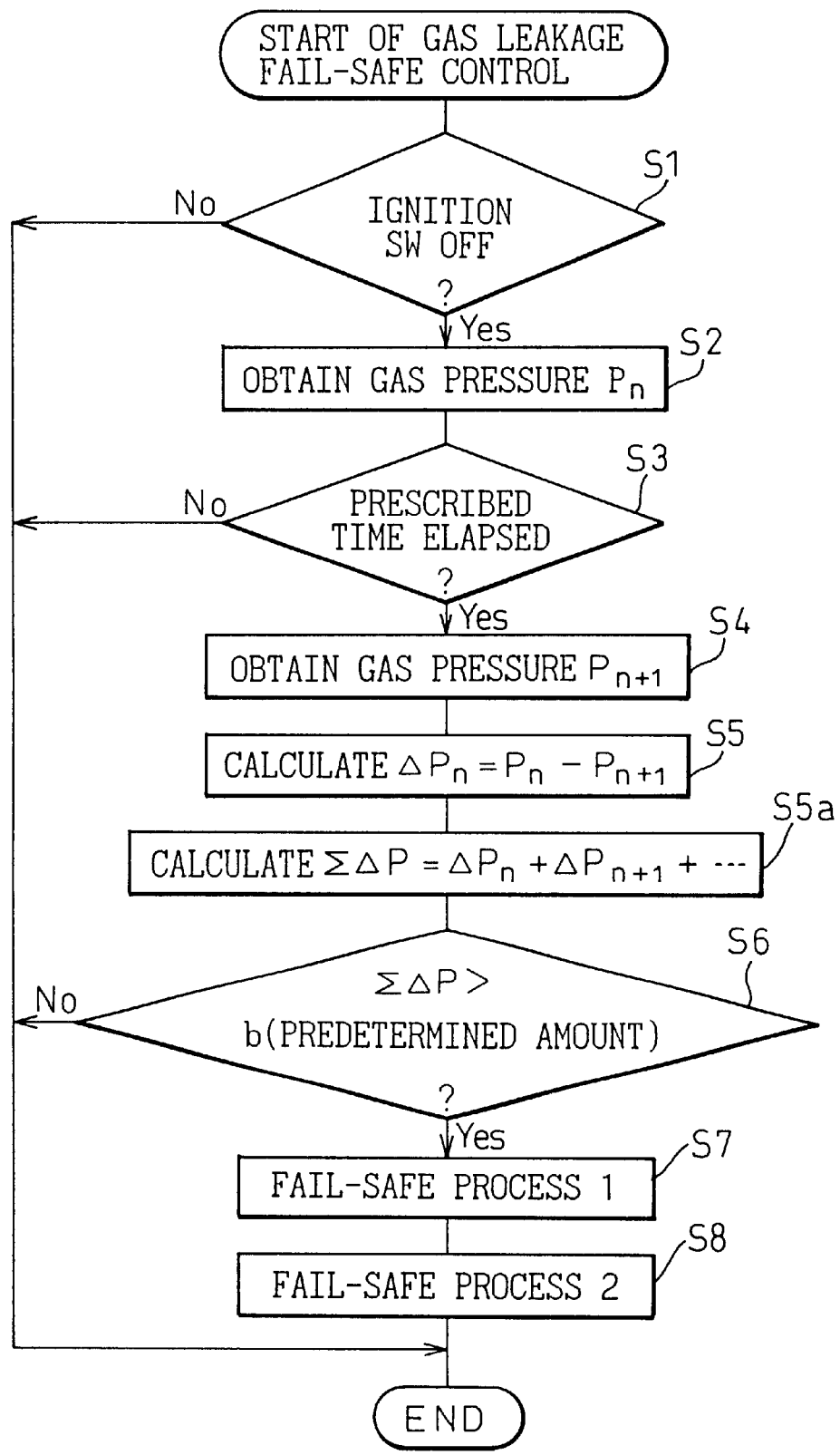
FIG. 4 is a flowchart illustrating the operation of another embodiment of the gas leakage detection and fail-safe control of the present invention.

FIG. 4 is a flowchart illustrating the operation of another embodiment of the gas leakage fail-safe control of the present invention. In this embodiment, the gas pressure difference is detected each time the engine is stopped and, if the accumulated value of the gas pressure difference exceeds a predetermined value, it is determined that gas is leaking. This is effective for the case where the amount of gas leakage is so small that it is difficult to detect gas leakage by detecting the amount of change of gas pressure only once.

When the gas leakage fail-safe control is started, first it is determined whether the ignition switch is OFF (S1). If the answer is YES, meaning that the engine is not running, and the first gas shut-off valve A, the second gas shut-off valve B, and the valve of the gas injector C are closed, gas pressure Pn in this condition is obtained (S2). In this case, $P_A$ or $P_B$ or both are obtained as the gas pressure. Next, it is determined whether a prescribed time has elapsed since the gas pressure Pn was obtained (S3). If the answer is YES, gas pressure Pn+1 at that point in time is obtained (S4). In this case also, $P_A$ or $P_B$ or both are obtained as the gas pressure. Then, the difference between the first obtained gas pressure Pn and the gas pressure Pn+1 obtained after the prescribed time has elapsed, that is, $\Delta Pn=Pn-Pn+1$, is calculated (S5). In this case also, gas pressure difference $\Delta Pna$ or $\Delta Pnb$ or $\Delta Pna+nb$ is calculated for the gas pressure $P_A$ or $P_B$ or both, respectively. The gas pressure difference $\Delta Pn$ is calculated each time the engine is stopped, and $\Sigma\Delta P$ is obtained and stored by accumulating the values thus calculated (S5a). If gas is leaking, the value of $\Sigma\Delta P$ gradually increases. Therefore, it is determined next. whether $\Sigma\Delta P$ is larger than a predetermined amount b (S6).

Figure 5:
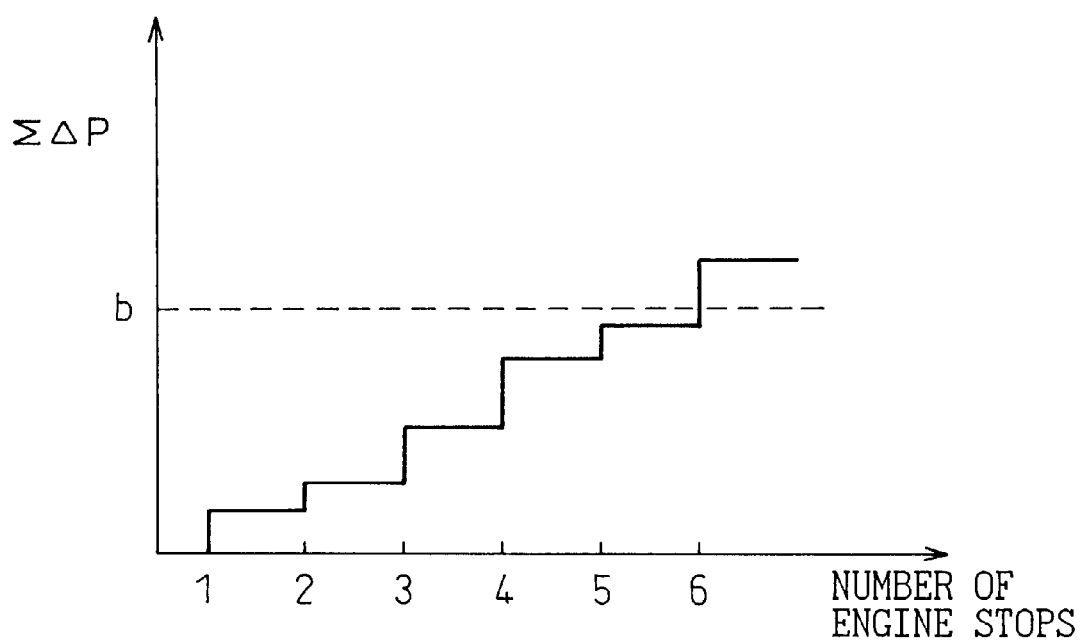
FIG. 5 is a graph showing the relationships between the number of engine stops, accumulated value of the amount of decrease of gas pressure, and a predetermined amount.

FIG. 5 is a graph showing the relationships between the number of engine stops, $\Sigma\Delta P$, and a predetermined amount b. The number of engine stops is plotted as abscissa and $\Sigma\Delta P$ as ordinate. If gas is leaking, the accumulated value of the gas pressure difference detected at each engine stop increases. In the graph, the predetermined amount is denoted by b. As previously noted, the tank gas pressure $P_A$, i.e., the gas pressure in the path between the first gas shut-off valve A and the second gas shut-off valve B, is normally in the range of about 200 to 250 kg/cm². In view of this, setting b=10 kg/cm², for example, if $\Sigma\Delta P>10$ kg/cm² then it is determined that gas is leaking. On the other hand, the tank gas pressure $P_B$, i.e., the gas pressure in the path between the second gas shut-off valve B and the gas injector C, is normally 9 kg/cm², as previously noted. In view of this, setting b=3 kg/cm², for example, if $\Sigma\Delta P>3$ kg/cm² then it is determined that gas is leaking. The sum of both pressure differences may be used. In that case, b=10, kg/cm² +3 kg/cm² 13 kg/cm². The value of b can be changed to suit specific situations. If the answer is YES in S6, that is, if it is determined that gas is leaking, fail-safe process 1 (S7) and fail-safe process 2 (S8) are carried out. In this case, either one or both of the processes 1 and 2 may be carried out. The details of the fail-safe processes are the same as those described with reference to FIG. 3.

Figure 6:
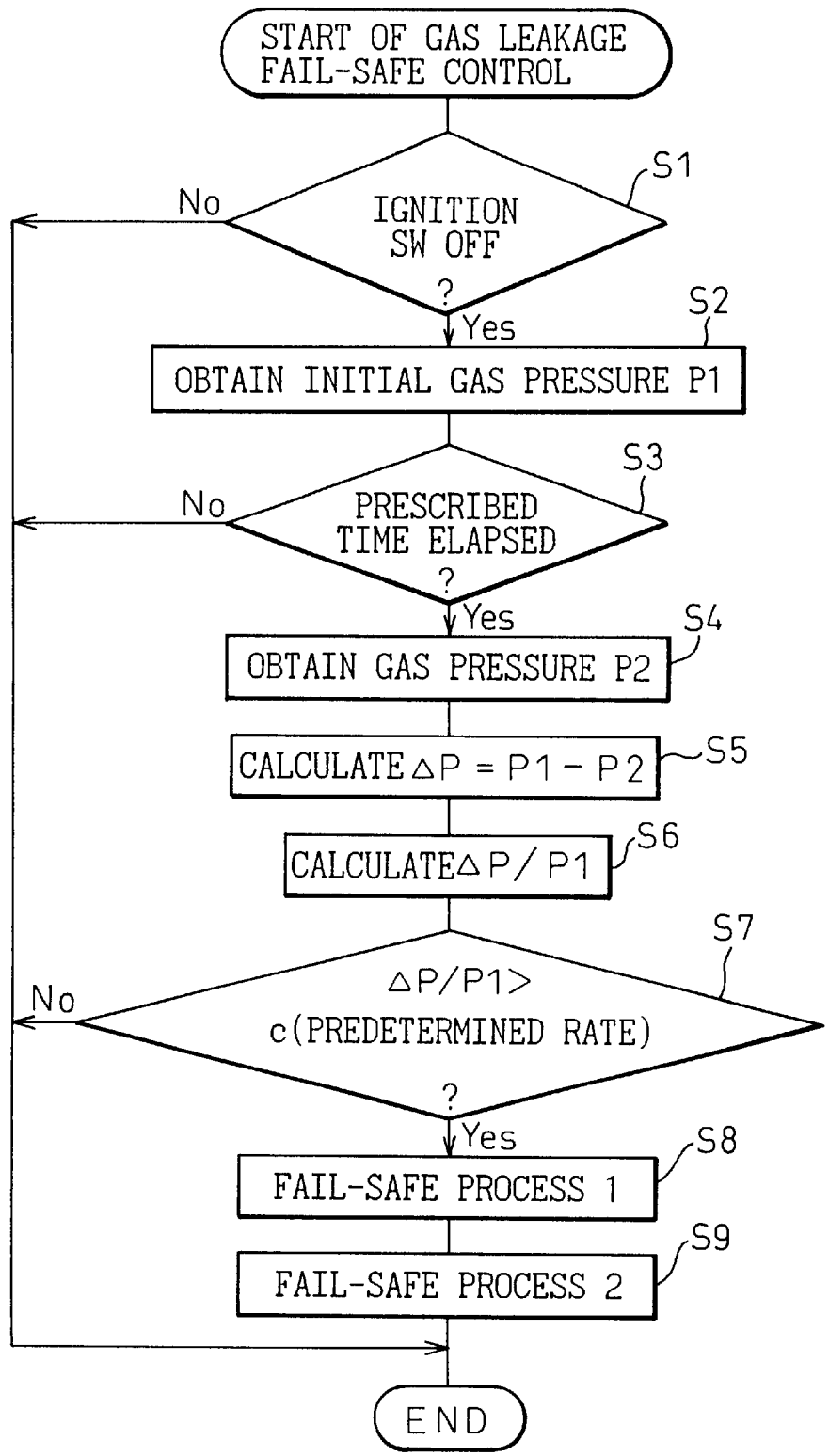
FIG. 6 is a flowchart illustrating the operation of a further embodiment of the gas leakage detection and fail-safe control of the present invention.

FIG. 6 is a flowchart illustrating the operation of a further embodiment of the gas leakage fail-safe control of the present invention. In this embodiment, the rate of decrease of gas pressure relative to the initially detected gas pressure is calculated after a prescribed time has elapsed and, if the rate of decrease of pressure thus calculated is larger than a predetermined value, it is determined that gas is leaking. The gas pressure varies depending on the remaining amount of gas. Accordingly, by detecting the rate of decrease of gas pressure, gas leakage can be detected with higher accuracy.

The processing performed in S1 to S5 is the same as that shown in FIG. 3. In the flowchart of FIG. 6, after the pressure difference $\Delta P$ is calculated in S5, the ratio of decrease of pressure, $\Delta P/P1$, is calculated (S6). If gas is leaking, the ratio of decrease $\Delta P/P1$ gradually increases. Next, it is determined whether the ratio of decrease is larger than a predetermined rate c (S7).

As previously noted, the tank gas pressure $P_A$, i.e., the gas pressure in the path between the first gas shut-off valve A and the second gas shut-off valve B, is normally in the range of about 200 to 250 kg/cm²; therefore, if the gas pressure drops by 10 kg/cm², for example, then c=10/200=5%. In view of this, and relative to $P_1$, if $\Delta P/P1$ (multiplied times 100 to convert the ratio to a percentage) >5%, it is determined that gas is leaking. On the other hand, the tank gas pressure $P_B$, i.e., the gas pressure in the path between the second gas shut-off valve B and the gas injector C, is normally 9 kg/cm² as previously noted; therefore, if the gas pressure drops by 3 kg/cm², for example, then c=3/9=33%. In view of this, and relative to P1, if $\Delta P/P1$ (multiplied by 100 to convert the ratio to a percentage)>33%, it is determined that gas is leaking. The sum of both pressure differences may be used to calculate the ratio of decrease. It will also be noted that the value of c can be changed to suit specific situations. If the answer is YES in S7, that is, if it is determined that gas is leaking, fail-safe process 1 (S8) and fail-safe process 2 (S9) are carried out. These processes 1 and 2 are the same as those described with reference to FIG. 3.

Figure 7:
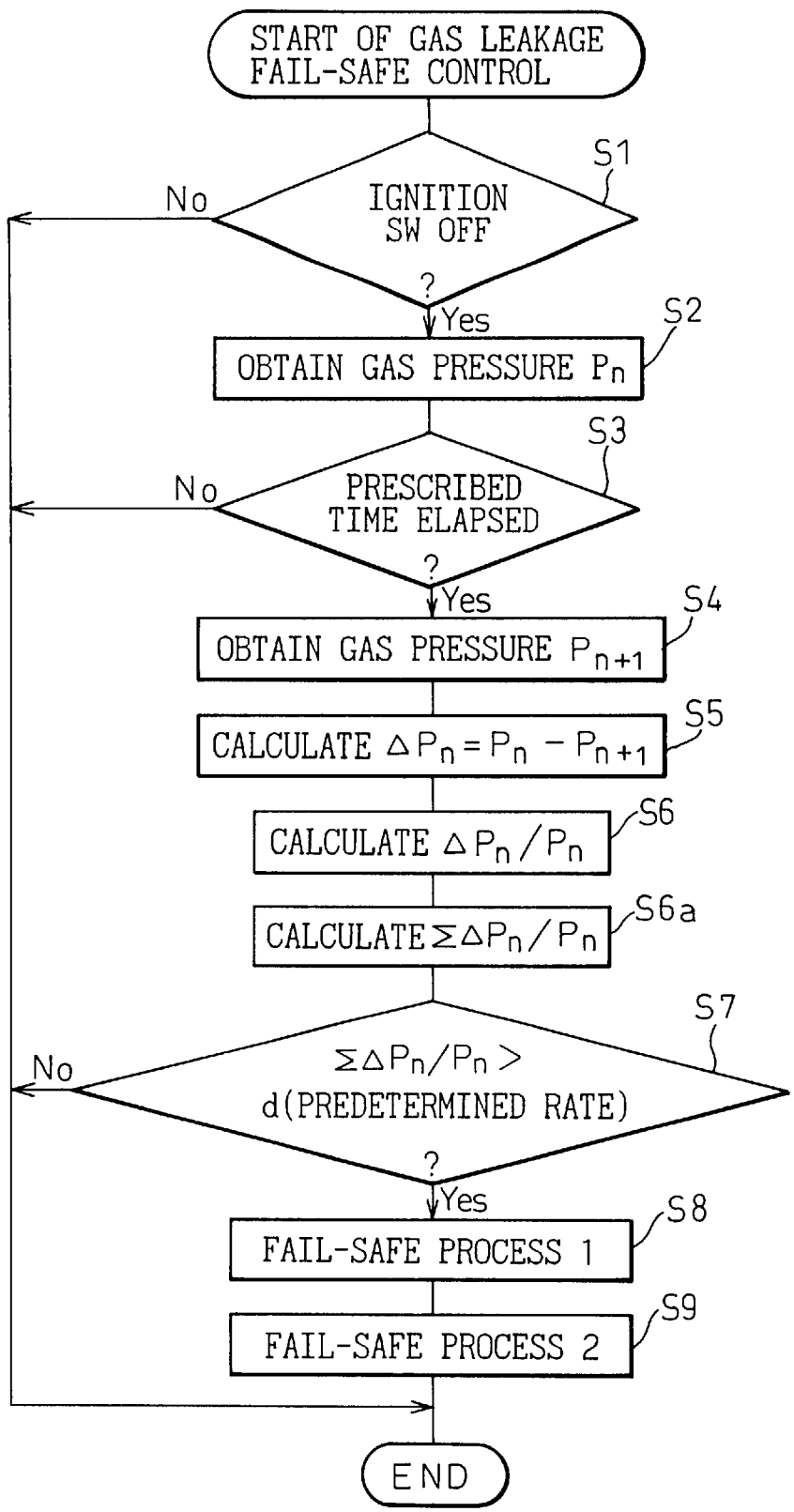
FIG. 7 is a flowchart illustrating the operation of a still further embodiment of the gas leakage detection and fail-safe control of the present invention.

FIG. 7 is a flowchart illustrating the operation of a still further embodiment of the gas leakage fail-safe control of the present invention. In this embodiment, the rate of decrease of gas pressure is calculated each-time the engine is stopped and, if the accumulated value of the rate of decrease thus calculated exceeds a-predetermined value, it is determined that gas is leaking. This is effective for the case where the amount of gas leakage is so small that it is difficult to detect gas leakage by detecting-the rate of change of gas pressure only once.

The processing performed in S1 to S5 is the same as that shown in FIG. 4. In the flowchart of FIG. 7, after the pressure difference $\Delta Pn$ is calculated in S5, the ratio of decrease of gas pressure, $\Delta Pn/Pn$, is calculated (S6). The ratio of decrease of gas pressure, $\Delta Pn/Pn$, is calculated each time the engine is stopped, and $\Sigma\Delta Pn/Pn$ is obtained and stored by accumulating the values thus calculated (S6a). If gas is leaking, the value of $\Sigma\Delta Pn/Pn$ gradually increases. Therefore, it is determined next whether $\Sigma\Delta Pn/Pn$ is larger than a predetermined ratio d (S7).

Figure 8:
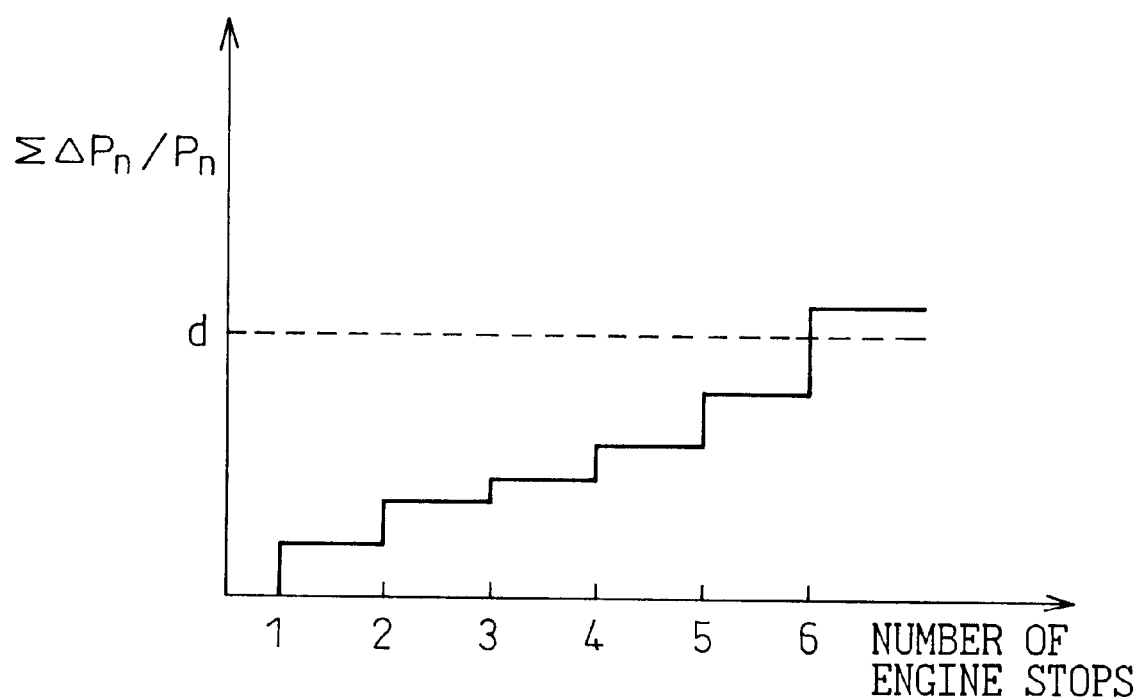
FIG. 8 is a graph showing the relationships between the number of engine stops, accumulated value of the rate of decrease of gas pressure, and a predetermined rate.

FIG. 8 is a graph showing the relationships between the number of engine stops, $\Sigma\Delta Pn/Pn$, and a predetermined ratio d. The number of engine stops is plotted as abscissa and $\Sigma\Delta Pn/Pn$ as ordinate. If gas is leaking, the accumulated value of the ratio of decrease of gas pressure detected at each engine stop increases. In the graph, the predetermined ratio is denoted by d. In the case of the tank gas pressure $P_A$, i.e., the gas pressure in the path between the first gas shut-off valve A and the second gas shut-off valve B, if $\Sigma\Delta Pn/Pn$ (multiplied by 100 to convert the ratio to a percentage)>5% relative to Pn, then it is determined that gas is leaking, as previously described. On the other hand, in the case of the tank gas pressure $P_B$, i.e., the gas pressure in the path between the second gas shut-off valve B and the gas injector C, if $\Sigma\Delta Pn/Pn$ (multiplied by 100 to convert the ratio to a percentage)>33% relative to Pn, then it is determined that gas is leaking, as previously described. The sum of both pressure differences may be used to calculate the ratio of decrease and obtain the accumulated value. It will also be noted that the value of d can be changed to suit specific situations. If the answer is YES in S7, that is, if it is determined that gas is leaking, fail-safe process 1 (S8) and fail-safe process 2 (S9) are carried out. In this case, either one or both of the processes 1 and 2 may be carried out. The details of the fail-safe processes are the same as those described with reference to FIG. 3. In the above embodiments, the amount of decrease and the ratio of decrease of gas pressure have been obtained by calculation, but these may be obtained by reading a map based on the detected Pn and Pn+1.

As described above, according to the present invention, when the engine is stopped and the gas shut-off valves are closed, the amount of decreases or the rate of decrease of gas pressure is calculated by comparing the initial gas pressure with the gas pressure detected after the elapse of a prescribed time; therefore, even small amounts of gas leakage can be detected. Further, by calculating the amount of decrease or the rate of decrease of gas pressure each time the engine is stopped, even trace amounts of gas leakage can be detected accurately.

Furthermore, when gas leakage is detected, fail-safe operation is performed by closing the gas shut-off valves, issuing a warning, etc. This serves to prevent air pollution in the event of gas leakage.

Summarizing the advantageous effects of the invention, explained above, the invention provides a gas leakage detection method for a gas-fueled internal combustion engine wherein, with the engine in a stopped condition, gas pressure at a predetermined location is detected at different times, the amount of decrease of gas pressure is detected by comparing the detected gas pressures, and gas leakage is detected based on the amount of decrease.

The invention also provides gas leakage detection method for a gas-fueled internal combustion engine, wherein each time the engine is stopped, gas pressure at a predetermined location is detected at different times, amount of decrease of gas pressure is detected by comparing the detected gas pressures, and gas leakage is detected based on an accumulated value, of the amount of decrease.

The invention further provides a gas leakage detection method for a gas-fueled internal combustion engine, wherein with the engine in a stopped condition, gas pressure at a predetermined location is detected at different times, rate of decrease of gas pressure is detected from the detected gas pressures, and gas leakage is detected based on the rate of decrease.

The invention also provides a gas leakage detection method for a gas-fueled internal combustion engine, wherein each time the engine is stopped, gas pressure at a predetermined location is detected at different times, the rate of decrease of gas pressures is detected from the detected gas pressures, and gas leakage is detected based on an accumulated value of the rate of decrease.

In the above gas leakage detection method, the gas pressure at the predetermined location is at least either a tank gas pressure or a delivery gas pressure.

In the above gas leakage detection method, gas leakage is detected by determining that gas is leaking when the amount of decrease or the accumulated value of the amount of decrease is larger than a predetermined value.

In the above gas leakage detection method, gas leakage is detected by determining that gas is leaking when the rate of decrease or the accumulated value of the rate of decrease is larger than a predetermined value.

The invention provides a fail-safe control method wherein, when gas leakage is detected by the above gas leakage detection method for a gas-fueled internal combustion engine, control is performed so as to close a delivery gas shut-off valve.

The invention also provides a fail-safe control method wherein, when gas leakage is detected by the above gas leakage detection method for a gas-fueled internal combustion engine, control is performed so as to keep a shut-off valve closed until a battery is disconnected and a memory is cleared.

The invention further provides a fail-safe control method wherein, when gas leakage is detected by the above gas leakage detection method for a gas-fueled internal combustion engine, control is performed so as to issue a warning.

In the above fail-safe control method, the warning is issued by illuminating or flashing a warning light.

In the above fail-safe control method, the flashing cycle of the warning light is changed according to the magnitude of the amount of decrease or the rate of decrease of gas pressure.

The invention also provides a fail-safe control method wherein, when gas leakage is detected by the above gas leakage detection method for a gas-fueled internal combustion engine, and when a delivery gas shut-off valve is closed, control is performed so as to issue a warning.

The invention provides a gas leakage detection apparatus for a gas-fueled internal combustion engine, comprising: gas pressure detection means for detecting gas pressure at a predetermined location at different times with the engine in a stopped condition; gas pressure decrease amount detection means for detecting amount of decrease of gas pressure by comparing the detected gas pressures; and gas leakage determining means for determining, based on the amount of decrease, whether gas is leaking or not.

The invention also provides a gas leakage detection apparatus for a gas-fueled internal combustion engine, comprising: gas pressure detection means for detecting gas pressure at a predetermined location at different times, each time the engine is stopped; gas pressure decrease amount detection means for detecting amount of decrease of gas pressure by comparing the detected gas pressures; gas pressure decrease amount accumulating means for accumulating the amount of decrease; and gas leakage determining means for determining, based on the accumulated amount of decrease, whether gas is leaking or not.

The invention further provides a gas leakage detection apparatus for a gas-fueled internal combustion engine, comprising: gas pressure detection means for detecting gas pressure at a predetermined location at different times with the engine in a stopped condition; gas pressure decrease rate detection means for detecting rate of decrease of gas pressure from the detected gas pressures; and gas leakage determining means for determining, based on the rate of decrease, whether gas is leaking or not.

The invention also provides a gas leakage detection apparatus for a gas-fueled internal combustion engine, comprising: gas pressure detection means for detecting gas pressure at a predetermined location at different times, each time the engine is stopped; gas pressure decrease rate detection means for detecting rate of decrease of gas pressure from the detected gas pressures; gas pressure decrease rate accumulating means for accumulating the rate of decrease; and gas leakage determining means for determining, based on the accumulated rate of decrease, whether gas is leaking or not.

In the above gas leakage detection apparatus, the gas pressure at the predetermined location is at least either a tank gas pressure or a delivery gas pressure.

In the above gas leakage detection apparatus, the gas leakage determining means detects gas leakage by determining that gas is leaking when the amount of decrease or the accumulated value of the amount of decrease is larger than a predetermined value.

In the above gas leakage detection apparatus, the gas leakage determining means detects gas leakage by determining that gas is leaking when the rate of decrease or the accumulated value of the rate of decrease is larger than a predetermined value.

The invention provides a fail-safe control apparatus for a gas-fueled internal combustion engine, comprising shut-off valve control means for performing control so as to close a delivery gas shut-off valve when gas leakage is detected by the above gas leakage detection apparatus for a gas-fueled internal combustion engine.

The invention also provides a fail-safe control apparatus for a gas-fueled-internal combustion engine, comprising shut-off valve control means for performing control so as to keep a shut-off valve closed until a battery is disconnected and a memory is cleared when gas leakage is detected by the above gas leakage detection apparatus for a gas-fueled internal combustion engine.

The invention further provides a fail-safe control apparatus, comprising warning issuing control device which performs control so as to issue a warning when gas leakage is detected by the above gas leakage detection apparatus for a gas-fueled internal combustion engine.

In the above fail-safe control apparatus the warning issuing control device causes a warning light to illuminate or flash.

In the above fail-safe control apparatus, the flashing cycle of the warning light is changed according to the magnitude of the amount of decrease or the rate of decrease of gas pressure.

The invention also provides a fail-safe control apparatus wherein, when gas leakage is detected by the above gas leakage detection apparatus for a gas-fueled internal combustion engine, and when a delivery gas shut-off valve is closed, control is performed so as to issue a warning.

What is claimed is:

1. A gas leakage detection method for a gas-fueled internal combustion engine wherein, with the engine in a stopped condition and shut-off valves closed, gas pressure at two or more predetermined locations before and after a gas pressure regulator in a gas feed path is detected at different times, an amount of decrease of gas pressure is detected by comparing the detected gas pressures, and gas leakage is detected when the amount of decrease exceeds a predetermined value.

2. A gas leakage detection method for a gas-fueled internal combustion engine as claimed in claim 1, wherein the gas pressure at the predetermined location is at least either a tank gas pressure or a delivery gas pressure.

3. A gas leakage detection method for a gas-fueled internal combustion engine as claimed in claim 1, wherein gas leakage is detected by determining that gas is leaking when the amount of decrease is larger than a predetermined value.

4. A fail-safe control method wherein, when gas leakage is detected by a gas leakage detection method for a gas-fueled internal combustion engine as claimed in claim 1, control is performed so as to close a delivery gas shut-off valve.

5. A fail-safe control method wherein, when gas leakage is detected by a gas leakage detection method for a gas-fueled internal combustion engine as claimed in claim 1, control is performed so as to keep a shut-off valve closed until a battery is disconnected and a memory is cleared.

6. A fail-safe control method wherein, when gas leakage is detected by a gas leakage detection method for a gas-fueled internal combustion engine as claimed in claim 1, control is performed so,as to issue a warning.

7. A fail-safe control method as claimed in claim 6, wherein the warning is issued by illuminating or flashing a warning light.

8. A fail-safe control method as claimed in claim 7, wherein the flashing cycle of the warning light is changed according to the magnitude of the amount of decrease or the rate of decrease of gas pressure.

9. A fail-safe control method wherein, when gas leakage is detected by a gas leakage detection method for a gas fueled internal combustion engine as claimed in claim 1, and when a delivery gas shut-off valve is closed, control is performed so as to issue a warning.

10. A gas leakage detection apparatus for a gas-fueled internal combustion engine as claimed in claim 1, wherein the gas pressure at the predetermined location is at least either a tank gas pressure or a delivery gas pressure.

11. A gas leakage detection method for a gas-fueled internal combustion engine wherein, each time the engine is stopped and shut-off valves are closed, gas pressure at two or more predetermined locations before and after a gas pressure regulator in a gas feed path is detected at different times,an amount of decrease of gas pressure is deleted by comparing the detected gas pressures, and gas leakage is detected when an accumulated value of the amount of decrease exceeds a predetermined value.

12. A as leakage detection method for a gas-fueled internal combustion engine as claimed in claim 11, wherein gas leakage is detected by determining that gas is leaking when the accumulated value of the amount of decrease is larger than a predetermined value.

13. A gas leakage detection method for a gas-fueled internal combustion engine wherein, with the engine in a stopped condition and shut-off valves closed, gas pressure at a predetermined location is detected at different times, a ratio of decrease of gas pressure is detected from the detected gas pressures, and gas leakage is detected when the ratio of decrease exceeds a predetermined value.

14. A gas leakage detection method for a gas-fueled internal combustion engine as claimed in claim 13, wherein gas leakage is detected by determining that gas is leaking when the ratio of decrease is larger than a predetermined value.

15. A gas leakage detection method for a gas-fueled internal combustion engine wherein, each time the engine is stopped and shut-off valves are closed, gas pressure at a predetermined location is detected at different times, a ratio of decrease of gas pressure is detected based on the detected gas pressures at different times, and gas leakage is detected when an accumulated value of the ratio of decrease of gas pressure exceeds a predetermined value.

16. A gas leakage detection method for a gas-fueled combustion engine as claimed in claim 4, wherein gas leakage is detected by determining that gas is leaking when the accumulated value of the ratio of decrease is larger than a predetermined value.

17. A gas leakage detection apparatus for a gas-fueled internal combustion engine, comprising: gas pressure detection means for detecting gas pressure at two or more predetermined locations before and after a gas pressure regulator in a gas feed path at different times with the engine in a stopped condition and shut-off valves closed; gas pressure decrease amount detection means for detecting an amount of decrease of gas pressure by comparing the detected gas pressures; and gas leakage determining means for determining, based on the amount of decrease relative to a predetermined value, whether gas is leaking.

18. A gas leakage detection apparatus for a gas-fueled internal combustion engine, as claimed in claim 17, wherein the gas leakage determining means detects gas leakage by determining that gas is leaking when the amount of decrease is larger than a predetermined value.

19. A fail-safe control apparatus for a gas-fueled internal combustion engine, comprising shut-off valve control means for performing control so as to close a delivery gas shut-off valve when gas leakage is detected by a gas leakage detection apparatus for a gas-fueled internal combustion engine as claimed in claim 17.

20. A fail-safe control apparatus for a gas-fueled internal combustion engine, comprising shut-off valve control means for performing control so as to keep a shut-off valve closed until a batter is disconnected and a memory is cleared when gas leakage is detected by a gas leakage detection apparatus for a gas-fueled internal combustion engine as claimed in claim 17.

21. A fail-safe control apparatus, comprising warning issuing control device which performs control so as to issue a warning when gas leakage is detected by a gas leakage detection apparatus for a gas fueled internal combustion engine as claimed in claim 17.

22. A fail-safe control apparatus as claimed in claim 21, wherein the warning issuing control device causes a warning light to illuminate or flash.

23. A fail-safe control apparatus as claimed in claim 22, wherein the flashing cycle of the warning light is changed according to the magnitude of the amount of decrease or the ratio of decrease of gas pressure.

24. A fail-safe control apparatus wherein, when gas leakage is detected by a gas leakage detection apparatus for a gas-fueled internal combustion engine as claimed in claim 17, and when a delivery gas shut-off valve is closed, control is performed so as to issue a warning.

25. A gas leakage detection apparatus for a gas-fueled internal combustion engine, comprising: gas pressure detection means for detecting gas pressure at a predetermined location at different times, each time the engine is stopped and shut-off valves are closed; gas pressure decrease amount detection means for detecting an amount of decrease of gas pressure by comparing the detected gas pressures; gas pressure decrease amount accumulating means for accumulating the amount of decrease; and gas leakage determining means for determining, based on the accumulated amount of decrease relative to a predetermined value, whether gas is leaking or not.

26. A gas leakage detection apparatus for a gas-fueled internal combustion engine, as claimed in claim 25, wherein the gas leakage determining means detects gas leakage by determining that gas is leaking when the accumulated value of the amount of decrease is larger than a predetermined value.

27. A gas leakage detection apparatus for a gas-fueled internal combustion engine, comprising: gas pressure detection means for detecting gas pressure at a predetermined location at different times with the engine in a stopped condition and shut-off valves closed; gas pressure decrease ratio detection means for detecting a ratio of decrease of gas pressure from the detected gas pressures; and gas leakage determining means for determining, based on the ratio of decrease relative to a predetermined value, whether gas is leaking or not.

28. A gas leakage detection apparatus for a gas-fueled internal combustion engine as claimed in claim 27, wherein the gas leakage determining means detects gas leakage by determining that gas is leaking when the ratio of decrease is larger than a predetermined value.

29. A gas leakage detection apparatus for a gas-fueled internal combustion engine, comprising: gas pressure detection means for detecting gas pressure at a predetermined location at different times, each time the engine is stopped and shut-off valves are closed; gas pressure decrease ratio detection means for detecting a ratio of decrease of gas pressure based on the detected gas pressures at different times; gas pressure decrease ratio accumulating means for accumulating the ratio of decrease of the gas pressure; and gas leakage determining means for determining, based on the accumulated ratio of decrease of the gas pressure relative to a predetermined value, whether gas is leaking or not. detects gas leakage by determining that gas is leaking when the ratio of decrease is larger than a predetermined value.

30. A gas leakage detection apparatus for a gas-fueled internal combustion engine as claimed in claim 29, wherein the gas leakage determining means detects gas leakage by determining that gas is leaking when the accumulated value of the ratio of decrease is larger than a predetermined value. pressure regulator in a gas feed path is detected at different times, an amount of decrease of gas pressure is detected by comparing the detected gas pressures, and gas leakage is detected when an accumulated value of the amount of decrease exceeds a predetermined value.

* * * * *